Nov. 22, 1949 W. H. RODEFELD 2,488,938
HAY HARVESTING MACHINE
Filed Dec. 29, 1945 2 Sheets-Sheet 1
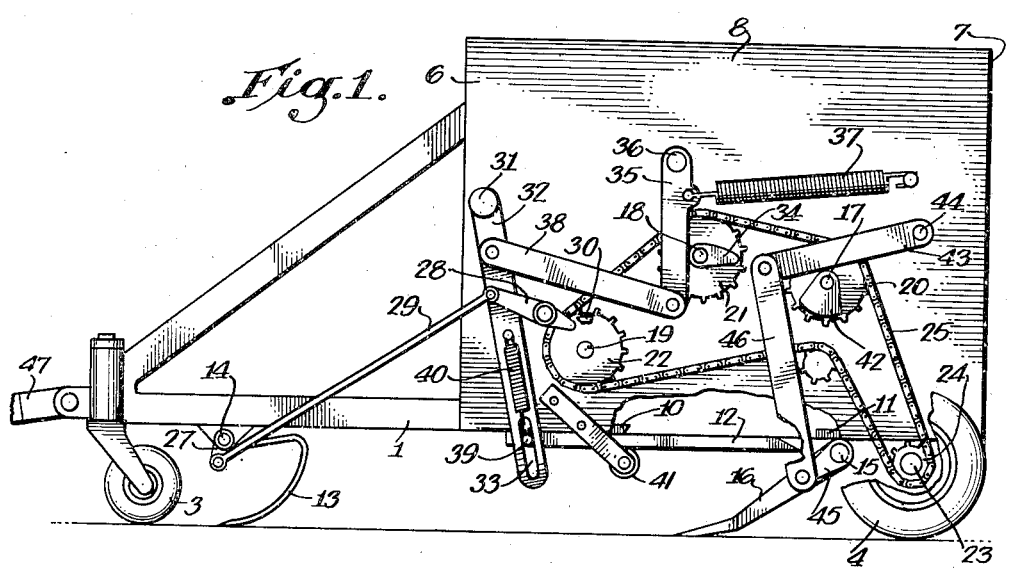
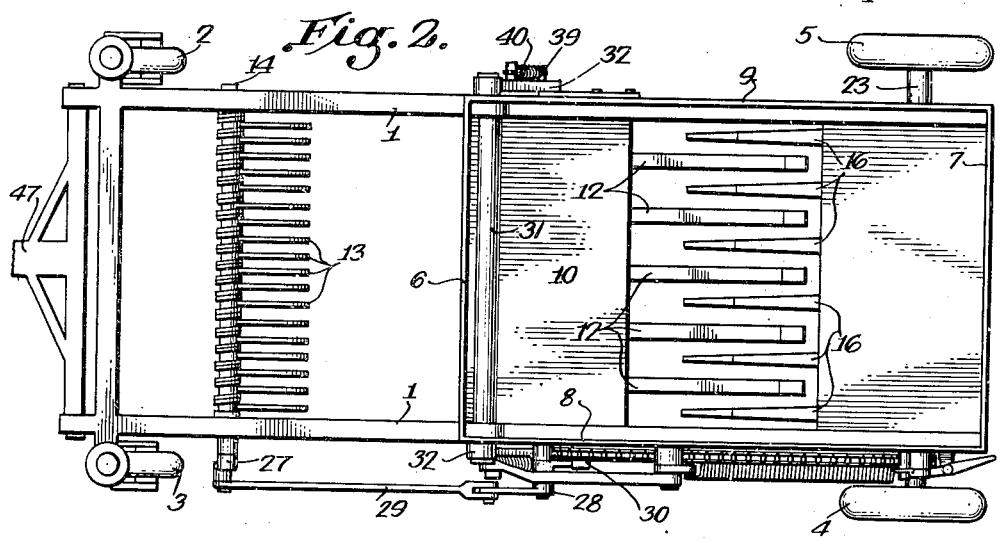
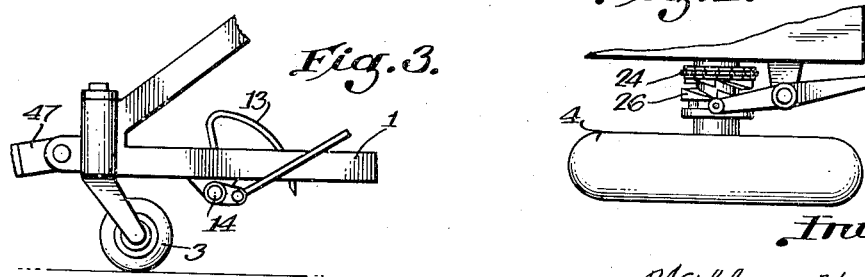
Inventor,
William H. Rodefeld Nov. 22, 1949     W. H. RODEFELD     2,488,938
HAY HARVESTING MACHINE
Filed Dec. 29, 1945     2 Sheets-Sheet 2
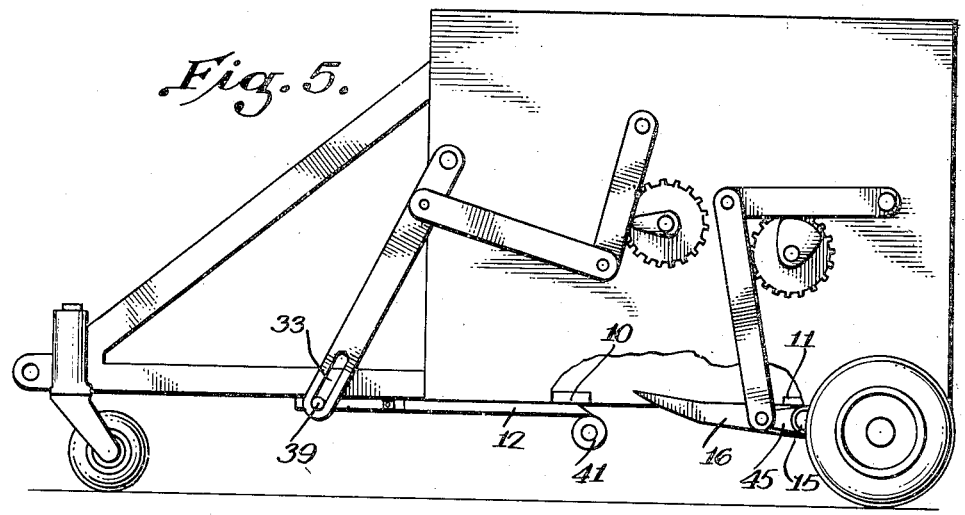
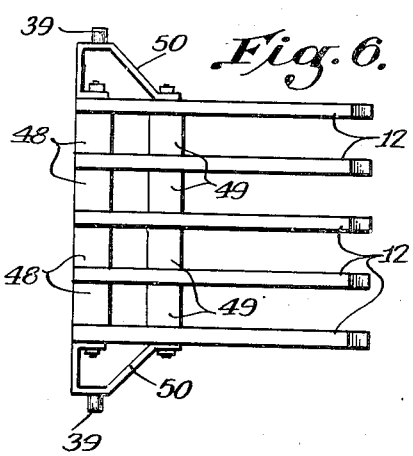
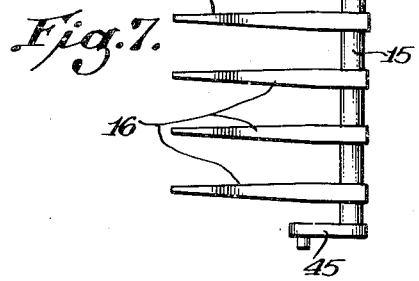
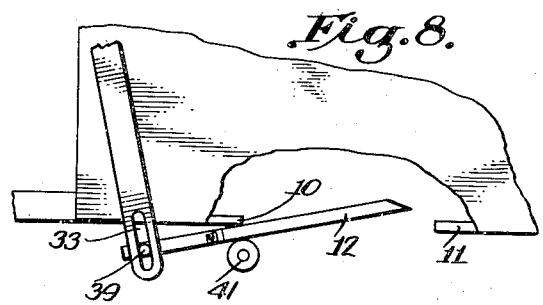
Inventor,
William H. Rodefeld.

Patented Nov. 22, 1949

2,488,938

UNITED STATES PATENT OFFICE 2,488,938

HAY HARVESTING MACHINE

William H. Rodefeld, Richmond, Ind.

Application December 29, 1945, Serial No. 637,805

1 Claim. (Cl. 214—79)

My present invention relates to machinery for harvesting hay and similar material.

The principal object of this invention is the provision of a machine combining raking and loading mechanism with a conveyance to provide means for more efficient harvesting of hay crops and similar material.

Another object is the provision of such a machine in which material enters the conveyance through the bottom thereof.

Another object is the provision of such a machine that is more compact than any such machines previously built.

Another object is the provision of such a machine in which the weight of material already loaded compacts material being loaded.

I attain these objects by mechanism illustrated in the accompanying two sheets of drawings, in which:

Figure 1 is a side view of the machine with some parts shown partly cut away and shows a wheeled conveyance with a carrying compartment with an opening in the bottom, and raking teeth to rake material into bunches as the machine travels, and elevating tines to elevate the bunched material into the carrying compartment through the opening in the bottom thereof and a set of holding bars to keep material in the carrying compartment from falling out through the opening in the bottom thereof and mechanism to operate the raking teeth and the elevating tines and the holding bars.

Figure 2 is a top view of the machine.

Figure 3 is a partial side view showing only the front part of the machine and showing the raking teeth in position to drop a bunch of raked material.

Figure 4 is an enlarged partial top view showing means to put the mechanism in or out of gear.

Figure 5 is a partial side view with part cut away and shows the elevating tines in raised position and shows the holding bars in a position removed from across the opening in the floor of the carrying compartment.

Fig. 6 shows a top view of the set of holding bars.

Figure 7 shows the set of elevating tines and a shaft to which they are fastened and an arm that is on one end of the shaft.

Figure 8 is a partial side view partly cut away and shows the set of holding bars in a tilted position permitted by the flexibility of their mounting.

Similar numerals refer to similar parts throughout the several views.

A frame 1 supported by wheels 2, 3, 4 and 5 comprise a chassis on which is a carrying compartment enclosed by ends 6 and 7 and sides 8 and 9. The bottom of the carrying compartment is floored by the floor sections 10 and 11. Between the floor sections 10 and 11 is an open space.

A set of movable bars 12 extend across the said open space to prevent material in the compartment from falling therethrough with the said bars 12 being arranged to be withdrawn from across the said open space during the time when material is being put upward therethrough.

Figure 1 shows part of the machine cut away to show the said open space and shows one of the bars 12 across the said open space.

Near the front of the machine a plurality of raking teeth 13 carried by a shaft 14 rake material as the machine travels forward. At intervals the raking teeth 13 rise to the position shown in Figure 3 and drop material they have raked in bunches leaving a bunch on the ground each time they rise.

A shaft 15 extends across the machine beneath the floor section 11 and secured thereto are a plurality of loading tines 16. The loading tines 16 extend forward from the shaft 15 and the points thereof pass under bunched material left by the raking teeth 13 as the machine moves forward and the bunched material is taken up by the loading tines 16. The loading tines 16 then swing upward and put the material through the said opening and into the carrying compartment.

The holding bars 12 move across the opening below the material on the loading tines immediately after the loading tines 16 have elevated the material into the carrying compartment, the loading tines 16 then swing down to be in position to take up the next bunch of material and the holding bars 12 remain in position to hold material in the compartment until the loading tines again swing upward to elevate more material into the compartment then the holding bars 12 slip out from under the material they have been holding to permit the next bunch of material to enter the compartment.

The operations just described repeat until the compartment is filled. As the compartment fills the incoming material presses material above it upward and the weight of material compacts incoming material and a heavier load is put into the compartment than would be possible if the material was not thus compacted as it is loaded.

As shown in Figure 2 the holding bars 12 are spaced to be between the loading tines 16 so as not to interfere with the movement of the loading tines 16 when they swing down to position to take up the next bunch of material.

Extending from the side 8 of the carrying compartment are three stub shafts 17, 18 and 19. Rotatably mounted on stub shaft 17 is a sprocket 20 and on stub shaft 18 is a sprocket 21 and on stub shaft 19 is a sprocket 22.

Located on the rear axle 23 is a sprocket 24.

A chain 25 connects sprockets 24, 20, 21 and 22.

The sprocket 24 is mounted free on the axle 23. A clutch arrangement shown in Figure 4 permits engagement or disengagement of the sprocket 24 and a collar 26 which is keyed to the axle 23. When engaged with collar 26 the sprocket 24 turns with the axle 23 when the machine travels.

Through the chain 25 the sprockets 20, 21 and 22 are rotated when sprocket 24 rotates with the axle 23.

On one end of the shaft 14 that carries the raking teeth 13 there is a lever 27. Pivoted near the sprocket 22 is a rocker arm 28. Connecting rocker arm 28 and lever 27 is a rod 29. Extending from one side of sprocket 22 is a lug 30. The lug 30 strikes the rocker arm 28 and pivots it on its mounting and through the rod 29 and the lever 27 the raking teeth 13 are raised.

Extending across the machine through the front of the carrying compartment is a shaft 31. On each end of shaft 31 a long lever 32 is secured. Through the lower end of each lever 32 there is a slot 33.

On sprocket 21 there is a cam 34. Against cam 34 there is a lever 35 that is pivoted at 36. A spring 37 keeps the lever 35 against the cam 34. A link 38 connects the lever 35 and one of the two long levers 32.

The holding bars 12 are fastened together as shown in Figure 6. There are spacers 48 and 49 between the bars and at each side is a bracket 50 each of which carries a trunnion 39. The trunnions 39 fit in the slots 33 in the long levers 32 as shown in Figures 1, 5 and 8.

On each lever 32 there is a spring 40 with the upper end of the springs 40 being connected to the levers 32 and the lower ends of the springs 40 being connected to the trunnions 39. The springs 40 keep the forward part of the set of bars 12 up against the frame 1.

A roller 41 extends crosswise under the frame of the machine and the bars 12 rest thereon.

By means of the cam 34 and the lever 35 and the link 38 and the levers 32 the bars 12 are withdrawn from across the opening in the bottom of the holding compartment. Acting through the levers 35 and 32 and the link 38 the spring 37 returns the bars 12 to position across the opening.

Carried by sprocket 20 is a cam 42. Bearing against cam 42 is a lever 43 that pivots at 44. On one end of the loading tines shaft 15 is a lever 45. Connecting levers 43 and 45 is a link 46. When the cam 42 raises lever 43 the lever 45 is raised by the link 46 and the loading tines 16 are thus raised.

The movements of the several parts are timed so that as the machine travels the raking teeth 13 drop material bunched and the loading tines take up the bunches and elevate them through the opening into the holding compartment and the holding bars 12 move under the material to hold it in the holding compartment.

The front wheels 2 and 3 are caster mounted to permit free turning of the machine.

Only partially shown is a tongue 47 by means of which any suitable pulling unit can be hitched to the machine.

Figure 8 shows the holding bars 12 in a tilted position. This flexibility in the mounting of the holding bars 12 prevents binding of the bars 12 in case the loading tines take up an extra large bunch of material and presses it against the holding bars 12 before they are withdrawn.

Having now described the invention, what I claim, and desire to secure by Letters Patent of the United States, is;

A combination conveyance and machine to take up hay and similar material with raking teeth arranged to bunch material on the ground and a set of tines arranged to take up the bunched material and rise with it to put it through an opening in the bottom of a compartment.

WILLIAM H. RODEFELD.

REFERENCES CITED

The following references are of record in the file of this patent:

UNITED STATES PATENTS

| Number | Name | Date |
| --- | --- | --- |
| 48,175 | Holley | June 13, 1865 |
| 54,392 | Nevergold et al. | May 1, 1866 |
| 515,679 | Hawkins | Feb. 27, 1894 |
| 1,540,940 | Howard et al. | June 9, 1925 |